United States Patent [19]

Paterson et al.

[11] Patent Number: 4,776,535
[45] Date of Patent: Oct. 11, 1988

[54] CONVOLUTED PLATE TO REDUCE BASE DRAG

[75] Inventors: Robert W. Paterson, Simsbury; Michael J. Werle, West Hartford, both of Conn.; Walter M. Presz, Jr., Wilbraham, Mass.

[73] Assignee: United Technologies Corporation, Hartford, Conn.

[21] Appl. No.: 117,770

[22] Filed: Nov. 5, 1987

Related U.S. Application Data

[63] Continuation-in-part of Ser. No. 947,164, Dec. 29, 1986.

[51] Int. Cl.$^4$ .............................................. B64C 1/38
[52] U.S. Cl. .................................. 244/130; 244/199; 296/180.1; 296/180.4
[58] Field of Search ................. 244/130, 200, 199; 296/1.5; 105/1.1, 1.2

[56] References Cited

U.S. PATENT DOCUMENTS

| | | | |
|---|---|---|---|
| 2,800,291 | 7/1957 | Stephens | 244/199 |
| 3,999,797 | 12/1976 | Kirsch et al. | 244/130 |
| 4,688,840 | 8/1987 | Kretschmer | 296/1.5 |
| 4,706,910 | 11/1987 | Walsh et al. | 244/199 |

FOREIGN PATENT DOCUMENTS

| | | | |
|---|---|---|---|
| 452986 | 11/1948 | Canada | 244/200 |
| 822352 | 11/1951 | Fed. Rep. of Germany | 244/130 |
| 845900 | 8/1952 | Fed. Rep. of Germany | 244/200 |
| 794841 | 2/1936 | France | 244/200 |

OTHER PUBLICATIONS

"The Reduction of Drag by Corrugating Trailing Edges", paper by D. L. Whitehead et al., Cambridge Univ., England, 1982.

*Primary Examiner*—Galen L. Barefoot
*Assistant Examiner*—Rodney Corl
*Attorney, Agent, or Firm*—Stephen E. Revis

[57] ABSTRACT

A body adapted to move downstream through a fluid has a downstream extending smooth surface terminating at a blunt base. Extending transversely across the smooth surface and disposed upstream of the blunt base is a thin, downstream extending plate closely spaced from the smooth surface. At least the downstream end portion of the plate is convoluted such that its downstream end is wave shaped. The convolutions are designed to generate pairs of counterrotating vortices which delay boundary layer separation from the smooth surface and cause fluid to flow into the space immediately behind the blunt base, reducing base drag on the body. The device generates very little drag of its own.

21 Claims, 7 Drawing Sheets

FIG. 1
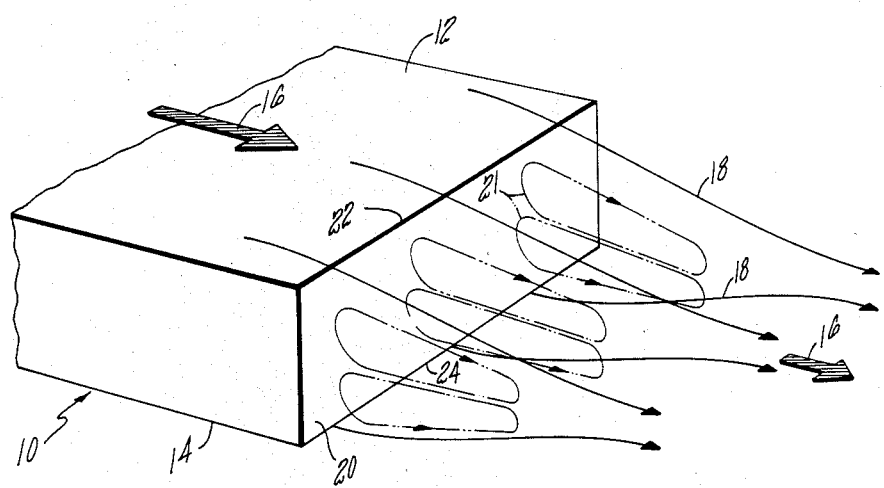
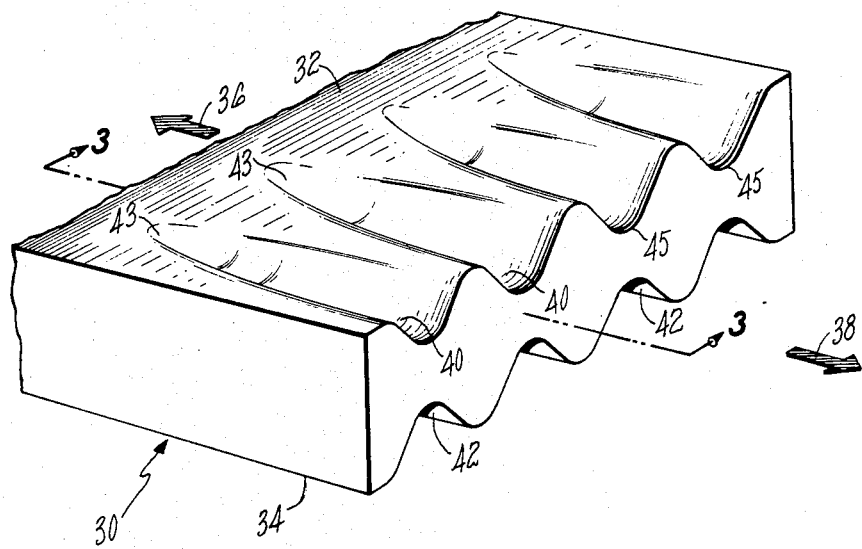
FIG. 2

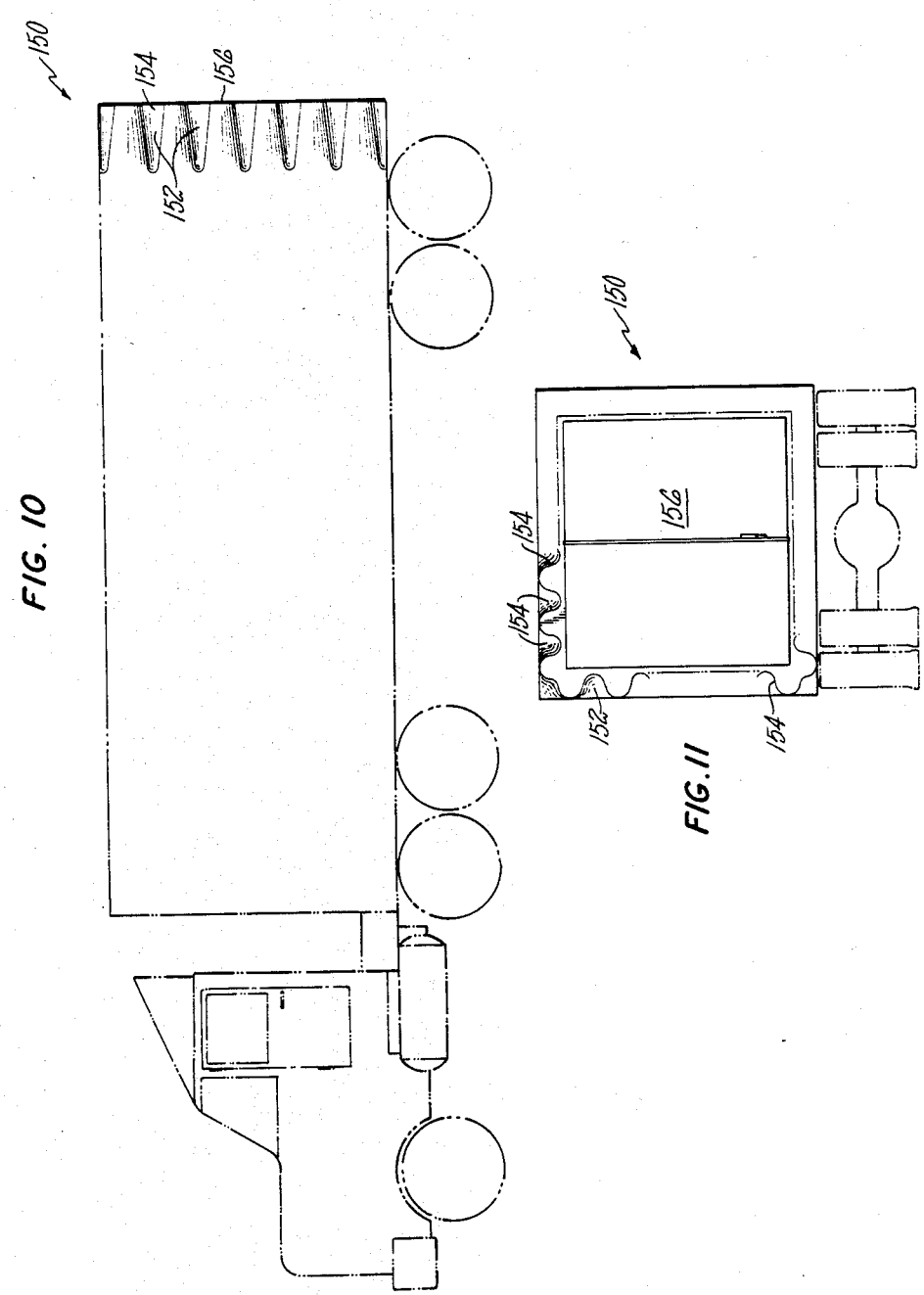

CONVOLUTED PLATE TO REDUCE BASE DRAG

CROSS REFERENCE TO RELATED APPLICATIONS

This application is a continuation-in-part application U.S. Ser. No. 947,164, filed 12/29/86.

Reference is hereby made to the following co-pending, commonly owned U.S. patent applications disclosing subject matter related to the subject matter of the present application: (1) U.S. Ser. No. 857,907 entitled, *Airfoil-Shaped Body*, by W. M. Presz, Jr. et al filed 4/30/86; (2) U.S. Ser. No. 857,908 entitled, *Fluid Dynamic Pump*, by W. M. Presz, Jr. et al filed 4/30/86; (3) U.S. Ser. No. 857,909 entitled, *Bodies With Reduced Surface Drag*, filed 4/30/86; (4) U.S. Ser. No. 857,910 entitled, *Diffuser*, by W. M. Presz, Jr. et al filed 4/30/86; (5) U.S. Ser. No. 947,163 entitled *Projectile with Reduced Base Drag* by R. W. Paterson et al filed 12/24/86; (6); U.S. Ser. No. 947,166 entitled *Improved Airfoil Trailing Edge*, by M. J. Werle et al filed 12/29/86; and (7) U.S. Ser. No. 947,349 entitled *Heat Transfer Enhancing Device*, by W. M. Presz, Jr. et al filed 12/29/86.

TECHNICAL FIELD

The present invention relates to reducing base drag.

BACKGROUND ART

Drag is the result of skin friction and surface pressure variations induced by viscous effects, especially those due to separation bubbles or regions (i.e., low pressure wakes). Separation regions occur when two and three dimensional boundary layers depart from the surface of the body. Bluff or blunt bodies have shapes which tend to promote a rapidly increasing downstream pressure gradient in the streamline flow around it which can cause the bulk flow to break loose from the surface of the body. This is particularly true for bodies having blunt end surfaces, such as automobiles, tractor trailers, and blunt ended projectiles. The separation bubbles created behind these objects as they move through the air produce high base drag.

Airfoil shaped bodies such as airplane wings, rudders, sails, and gas turbine engine rotor blades and stator vanes have a streamlined shaped which, at moderate angles of attack (below about 15°) avoid streamwise two-dimensional boundary layer separation over the entire surface. At higher angles of attack (or increased loading) separation does occur and a recirculating flow region (or a low pressure wake) is formed, greatly increasing drag and reducing lift. As used in the specification and appended claims, "streamwise, two-dimensional boundary layer separation" means the breaking loose of the bulk fluid from the surface of a body, resulting in flow near the wall moving in a direction opposite the bulk fluid flow direction.

It has been a constant goal of aerodynamicists to reduce the drag and improve lift and stall characteristics (if appropriate) on bodies disposed in a fluid moving relative thereto. A common way to avoid boundary layer separation on an airfoil (or other streamlined body) or to at least delay separation such that it occurs as far downstream along the surface of the airfoil as possible so as to minimize drag, is to reduce the pressure rise downstream such as by tailoring the surface contour along the length of the airfoil in the direction of bulk fluid flow.

Another well known method for reducing the drag on airfoils is to create turbulence in the boundary layer so as to impart a greater average momentum of the boundary layer fluid, which carries it further downstream along the surface against an adverse pressure gradient, thereby delaying the separation point. For example, U.S. Pat. No. 4,455,045 to Wheeler describes elongated, expanding channels in the flow surface. The channels have sharp, lengthwise edges. The boundary layer on the surface flows into the channels, and the channel edges create streamwise vortices below the level of the normal flow surface which energize the flow in the channel to maintain boundary layer attachment of the flow along the floor of the channel.

Similarly, Stephens (U.S. Pat. No. 2,800,291) creates a plurality of adjacent streamwise extending channels in the flow surface. The channels continuously expand laterally from a narrow inlet to a wide outlet. A generally triangular ramp is formed between adjacent channels. Stephens explains that the boundary layer flow is split between the ramps and the channels. The flow within the channels spreads out and the boundary layer becomes thinner and remains attached to the surface longer. The ramp flow is diverted into the general flow. One application (FIG. 6 of Stephens) is between the roof and rear window of an automobile to maintain the flow attached to the curved surface for a greater distance than normal.

In U.S. Pat. No. 1,773,280 to Scott, increased lift without increased drag is created for an aircraft wing by placing a plurality of side-by-side chordwise extending ridges along the top of the wing from its leading to its trailing edge, the ridges having their highest point near the thickest portion of the wing. The ridges themselves are airfoil shaped when viewed from above, tapering to a point at the trailing edge of the wing. This concept does not take into account viscous induced boundary layer separation effects and therefore could not be expected to avoid separation at high lift conditions.

U.S. Pat. No. 3,588,005 to Rethorst uses chordwise extending ridges in the upper surface of an airfoil to delay the onset of separation by providing "channels of accelerated flow in the free stream flow direction to add energy to the boundary layer and maintain laminar flow in the region of normally adverse pressure gradient". The ridges protrude from the surface "to a height of the order of the boundary layer thickness". Cross flow components "are accelerated over the ridges and may reduce the likelihood of separation near the aft end . . . of the body by allowing the flow to 'corkscrew' smoothly off the aft end rather than encounter the abrupt adverse pressure gradient in the free stream direction caused by a blunted aft end". As with the ridges of the Scott patent discussed above, flow is also accelerated between the ridges which further helps maintain laminar flow over the airfoil surface.

U.S. Pat. Nos. 3,741,235 and 3,578,264 to Kuethe delay separation by creating vortices using a series of crests or concave depressions which extend substantially transverse to the streamwise flow direction. Kuethe states that the maximum height of a crest or depth of a depression is preferably less than the boundary layer thickness.

In a paper titled "The Reduction of Drag by Corrugating Trailing Edges" by D. L. Whitehead, M. Kodz, and P. M. Hield published by Cambridge University, England in 1982, blunt base drag of a blade (having a 20-inch span, 20-inch chord length, a constant thickness of 1.5 inches and a blunt trailing edge) is reduced by forming the last seven inches of its chordwise length into streamwise extending, alternating troughs and ridges (corrugations). The trailing edge and any upstream cross-section across the corrugations has the shape of a sine wave with an 8.0 inch wavelength. The thickness of the blade material is maintained constant over the length of each trough and ridge, although the trough depth or ridge height (i.e., wave amplitude) transitions from a maximum of 2.0 inches at the trailing edge to zero upstream. The total trough outlet area is more than 50% of the blunt base area. FIGS. 19-21 show the blade described therein, with dimensions given in terms of a unit length "a". A reduction of base drag of about one-third was realized when compared with a reference blade without corrugation. It is explained that spanwise vortices which were shed alternately from the top and bottom rear edges of the non-corrugated reference blade were eliminated by the corrugations.

In general, it is believed that the separation delaying devices of the prior art create significant drag in their own right, thereby negating some of the benefits they would otherwise provide. This sometimes limits their effectiveness. While many of the devices of the prior art have proved to be effective in reducing drag, further improvement is still desired, such as with respect to reducing base drag on blunt based objects.

DISCLOSURE OF THE INVENTION

One object of the present invention is to reduce the drag on blunt ended bodies.

Another object of the present invention is to reduce the size of the separation bubble downstream of a blunt ended body.

Accordingly, the present invention is a plate-like member having a convoluted downstream portion which generates a plurality of adjacent vortices rotating in opposite directions about respective axes extending in the direction of bulk fluid flow adjacent the plate-like member, the member being adapted to be disposed upstream of a blunt end surface such that the vortices reduce base drag.

More specifically, an article or body adapted to be disposed in a fluid moving downstream relative thereto has a generally streamwise extending body surface which terminates as a blunt, generally downstream facing end surface. The convoluted plate-like member is disposed upstream of the blunt end surface and is supported in closely spaced relation to the body surface. The convoluted portion of the plate-like member comprises a plurality of adjoining, alternating, U-shaped lobes and troughs extending in the direction of the bulk fluid flow near the member and terminating at a downstream edge, which is wave shaped. The trough depth and lobe height increase in the downstream direction, and the troughs and lobes are contoured and dimensioned such that each trough generates a pair of adjacent vortices downstream of the plate member downstream edge. If the body surface transitions smoothly as a curved surface into the blunt end surface the vortices will energize the boundary layer on the body surface and delay its separation therefrom, thereby reducing drag. Also, and even if the body surface and the blunt end surface form a relatively sharp edge where they join together, the vortices cause fluid to flow into the space immediately downstream of the blunt end surface to reduce the size of the separation bubble.

More specifically, it is believed that the fluid leaves the troughs of the convoluted wall member with a direction of momentum that carries it over the blunt end surface into the normally stagnant region behind the blunt end surface (i.e., a downwash is created). Additionally, it is believed that each trough generates a single, large-scale axial vortex from each side wall surface at the trough outlet. (By "large-scale" it is meant the vortices have a diameter about the size of the overall trough depth.) These two vortices rotate in opposite directions and create a flow field which tends to cause fluid from the trough and also from the nearby bulk fluid to move into the region behind the blunt surface. The net effect of this phenomenon either alone or coupled with the downwash effect, is to reduce the intensity of the low pressure wake formed behind a blunt end surface, thereby reducing base drag. Additionally, in cases where the shedding of spanwise vortices is an additional contributor to base drag, it is believed that the present invention suppresses such shedding.

The troughs and lobes of the present invention are preferably controured such that they flow full (i.e., no streamwise, two-dimensional boundary layer separation occurs within the troughs). Thus, it is important there is no streamwise, two-dimensional boundary layer separation of the flow immediately upstream of the troughs as this would result in separated flow entering the troughs, which would inhibit the formation of strong vortices. The prevention of streamwise, two-dimensional boundary layer within the troughs is an important consideration in their design. For example, two-dimensional boundary layer separation will occur if the slope of the bottom of a trough is too steep relative to the bulk fluid flow direction.

Preferably the troughs and lobes are U-shaped in cross section taken perpendicular to the downstream direction and are preferably smoothly curved (e.g., no sharp angles where trough sidewall surfaces meet the trough floor) to minimize losses. Most preferably the troughs and lobes form a smoothly undulating surface which is wave-shaped in cross section perpendicular to the downstream direction.

One important advantage of the present invention is its ability to reduce base drag without introducing a substantial drag penalty as a result of its own presence in the flow field. This is of considerable advantage as compared to drag reducing devices of the prior art.

Commonly owned U.S. patent application Ser. No. 857,907 filed on Apr. 30, 1986 titled *Airfoil Shaped Body*, by Walter M. Presz, Jr. et al (hereinafter the '907 application) describes an airfoil trailing edge region with streamwise troughs and ridges (convolutions) formed therein defining a wave-like, thin trailing edge. The troughs in one surface define the ridges in the opposing surface. The troughs and the ridges help delay or prevent the catastrophic effects of two-dimensional boundary layer separation on the airfoil suction surface, by providing three-dimensional relief for the low momentum boundary layer flow. The present invention, however, is directed to reducing the base drag created behind a blunt based article; and it uses a separate convoluted wall member to do so.

According to another aspect of the present invention, it is preferred that the fluid exiting from each trough have a lateral component of velocity as small as possible to minimize secondary flow losses. For this reason the trough sidewalls, for a significant distance upstream of the trough outlet, are preferably parallel to the direction of bulk fluid entering the trough.

In accordance with another aspect of the present invention, it is preferred that the trough sidewalls at the outlet be steep. This is believed to increase the intensity of the vortex generated by the sidewall. The word "steep" as used herein and in the claims means that, in cross section perpendicular to the direction of trough length, lines tangent to the steepest point on each sidewall intersect to form an included angle of no more than about 120°. Most preferably the walls are parallel to each other. For purposes of this application, when the walls are parallel the included angle shall be considered to be zero degrees.

The present invention is also suitable for use on bodies having oppositely facing, spaced apart, streamwise extending surfaces which are joined by a blunt, downstream facing end surface substantially perpendicular to the flow direction. In that instance a convoluted wall member may be located adjacent each streamwise extending surface. Each convoluted member creates a flow of fluid across the blunt end surface toward the opposite side. Whether one or both surface include a convoluted wall member, the troughs of each wall member should have a sufficient depth at their outlets and be of sufficient cross-sectional flow area relative to the total surface area model of the blunt end surface to have a not insignificant effect on the separation bubble which would normally be formed without use of the present invention. A minimum trough outlet depth of only a few percent of the distance between the oppositely facing surfaces at the blunt end can be effective.

The foregoing and other objects, features and advantages of the present invention will become more apparent in the light of the following detailed description of preferred embodiments thereof as illustrated in the accompanying drawing.

BRIEF DESCRIPTION OF THE DRAWING

FIG. 1 illustrates the fluid dynamics associated with a blunt based body moving relative to a fluid stream.

FIG. 2 is a perspective view of a blunt based article incorporating features of the parent application of this CIP application.

FIG. 10 is a side elevation view of a tractor trailer incorporating features of the parent application of this CIP application.

FIG. 11 is an end view of the tractor trailer taken generally in the direction of the line 11—11 of FIG. 10.

FIG. 14A is a sectional view taken along the line 14A—14A of FIG. 14.

BEST MODE FOR CARRYING OUT THE INVENTION

Figure 3:
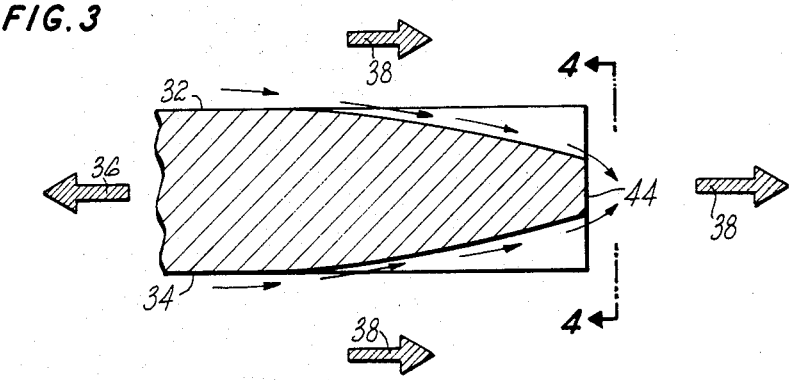
FIG. 3 is a sectional view taken along the line 3—3 of FIG. 2.

FIG. 1 illustrates what occurs when fluid flows over the surface of a body which terminates at a blunt downstream end. In this figure the body is represented by the reference numeral 10, and includes upper and lower smooth, flat surfaces 12, 14, respectively, over which fluid is flowing. The wide arrows 16 represent the downstream direction, while the lines 18 represent streamlines of the bulk fluid flowing adjacent the surfaces 12, 14. As is well known in the art, although the fluid may stay result of the body 10 moving through the fluid in an upstream direction, this low pressure stagnation region results in a force in the downstream direction which resists or is opposite to any force attempting to move the body in the upstream direction. This force is required to as the base drag, and can be substantial.

The invention of the parent application U.S. Ser. No. 947,164 which this continuation-in-part application is based reduces base drag while introducing minimal other losses which counteract the benefits of reduced base drag. That invention is illustratively shown and described with reference to FIGS. 2-6. As shown in FIG. 2, an article incorporating such invention is generally represented by the numeral 30. The article has an upper surface 32 and a lower surface 34. It is assumed that the article is moving through a fluid, such as air, in an upstream direction generally represented by the arrow 36. The downstream direction is represented by the arrow 38. According to the present invention a plurality of downstream extending troughs 40 are formed in the upper surface 32; and a plurality of downstream extending troughs 42 are formed in the lower surface 34. The troughs are generally U-shaped in cross section taken perpendicular to the downstream direction. Each trough extends from its respective inlet 43 to a blunt end surface 44 which joins the upper and lower surfaces 32, 34 and faces substantially downstream.

Figure 6:
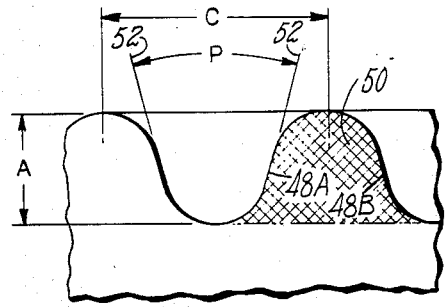
FIG. 6 is an enlarged view of the area designated Y in FIG. 4.

The troughs may be contoured, sized and shaped to flow full over their entire length which means that streamwise boundary layer separation does not occur within the troughs. In this regard, the fluid flowing along the surfaces 32, 34 must also be attached to such surfaces (i.e., no streamwise boundary layer separation) as it enters the trough inlets. The trough outlets 45 in the end surface 44 have an amplitude or depth A (FIG. 6). They have zero depth at their upstream ends and blend smoothly into their respective upper and lower surfaces at their upstream ends and along their length. Preferably each trough increases in depth from its upstream end to its outlet. However, this is not required. For example, the depth could reach a maximum upstream of the trough outlet and then remain constant to the outlet.

Figure 5:
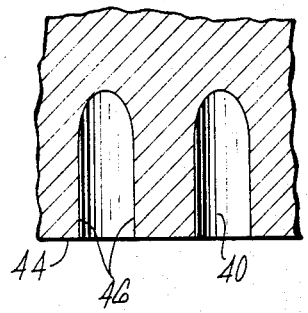
FIG. 5 is a sectional view taken generally in the direction of the line 5—5 of FIG. 4.

Note that the troughs are smoothly U-shaped along their length in cross section perpendicular to the downstream direction and define a smoothly undulating surface which is wave shaped in cross section perpendicular to the downstream direction. Each trough has a pair of facing sidewall surfaces 46 which terminate as side edges 48 of the trough outlet 45. Preferably the sidewall surfaces 46 are substantially parallel to the direction of bulk fluid flow over the surface in which they are disposed over a substantial continuous portion of the length of the trough, which includes the trough outlet. The parallel nature of the sidewall surfaces 48 is best shown in FIG. 5. It is undesirable that the sidewalls diverge since it contributes to steamwise separation within the troughs and introduces lateral velocity components in the fluid leaving the trough, which create undesirable secondary flow losses.

It is believed that a couple of different fluid dynamic mechanisms are responsible for the reduced base drag resulting from the troughs just described, although these mechanisms are not fully understood. It is felt, for example, that there is a bulk motion of the fluid leaving the troughs which motion is into the space immediately behind and adjacent the blunt end surface as if it were, to some extent, remaining attached to the blunt end surface of the article after it exits the troughs. Second, it is believed that each trough generates a pair of large-scale axial vortices, the axial direction being the downstream direction. Each vortex is generated off of a respective one of the two trough side edges 48. The vortices of each pair rotate in opposite directions. These vortices create a flow field which tends to cause fluid from the trough and from the nearby bulk fluid to move into the region behind and adjacent the blunt surface.

In order that the vortex generated off of the side edge 48 of one outlet is not interfered with (i.e., cancelled out) by a counterrotating vortex generated off the side edge of the next adjacent trough it is necessary that the side edges of adjacent troughs be spaced apart by a sufficient distance. Thus, it is necessary that a portion of the area of the blunt end surface 44 extend laterally from the side edge 48 of each trough outlet to the side edge 48 of an adjacent trough outlet over the full length of each of the side edges. This area of the blunt end surface is represented by the cross hatched area 50 of FIG. 6 disposed between the trough side edges designated by the reference numerals 48A and 48B. In general, the downstream projection of the area 50 between the side edges of adjacent troughs should be at least about one quarter ($\frac{1}{4}$) of the downstream projected outlet area of a trough.

It is further believed that best results are obtained when the side wall surfaces 48 at the outlet are steep. Preferably, in a cross section perpendicular to the downstream direction, which is the direction of trough length, lines 52 tangent to the steepest points along the side edges 48 should form an included angle C (FIG. 6) of no greater than about 120°. Preferably C should be between 0° and 60°. The closer angle C is zero degrees (0°), the better.

The troughs should be large enough in downstream projected cross-sectional area at their outlets, relative to the total downstream projected area of the blunt end surface to have a worthwhile impact on the base drag. For some applications a total trough outlet area which is only a few percent of the total blunt base may produce a measurable reduction in base drag. For most applications a trough outlet area no more than 30% of the total blunt base area would be used due to practical considerations.

It is also believed that the troughs should not be too narrow relative to their depth, otherwise appropriate flow patterns within the trough will not develop and the desired base drag reduction will not occur. With reference to FIG. 6, the trough width at its outlet is considered to be the peak to peak wave length P, and the trough depth at the outlet is considered to be the peak to peak wave amplitude A. The ratio P/A should be greater than about 0.25 and preferably at least 0.5. Additionally, the ratio P/A should be less than about 4.0.

The results will also not be very effective if the trough is too long relative to its outlet depth (amplitude) since the appropriate flow fields generated within the trough will dampen out before reaching the outlet. It is believed that the ratio of trough length to outlet amplitude should be no greater than about 12 to 1.0.

Figure 7:
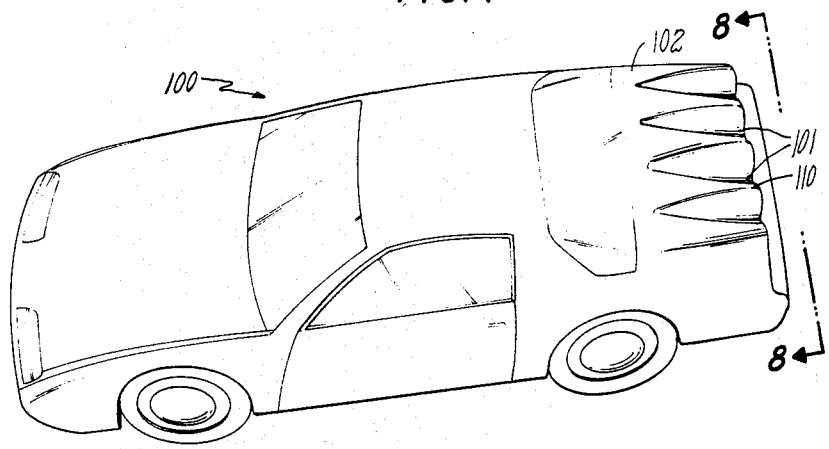
FIG. 7 is a perspective view of an automobile incorporating features of the parent application of this CIP application.
Figure 8:
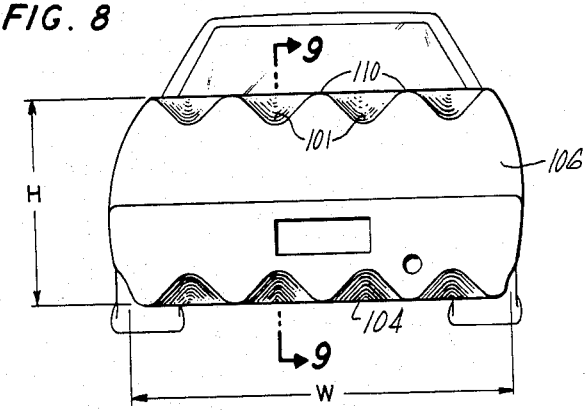
FIG. 8 is an end view of the automobile taken generally in the direction of the line 8—8 of FIG. 7.
Figure 9:
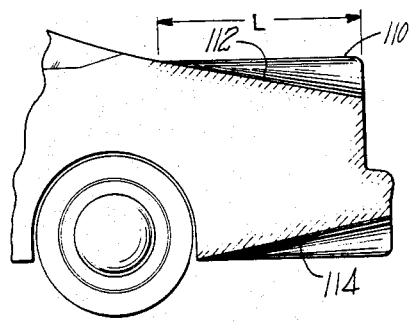
FIG. 9 is a partial sectional view taken along the line 9—9 of FIG. 8.

In FIGS. 7-9 a trough configuration similar to that shown in FIGS. 2-6 is incorporated in the rear end of an automobile generally represented by the reference numeral 100. The troughs 101 are formed in the upper trunk surface 102 and in the under surface 104 of the vehicle. The troughs intersect the rearwardly facing blunt end surface 106. One distinction between the embodiment of FIGS. 7-9 and the embodiment of FIGS. 2-6 is that the troughs 101 are formed by adding lobes 110 to the original vehicle contours represented by the lines 112 and 114.

As a test, a 1/25th scale model of a Pontiac Firebird Trans-Am was purchased and troughs were formed on the trunk lid surface and on the under surface of the car by adding material as opposed to cutting away material. This resulted in adding additional blunt base area to the automobile. The floor or bottom of each trough followed approximately the contour of the original surface of the vehicle. Referring to FIGS. 8 and 9, the overall dimensions of the blunt end surface were H=1.4 inches and W=2.9 inches. The length L of the troughs was 1.4 inches. The troughs formed a smoothly undulating surface which was wave shaped in cross section taken perpendicular to the downstream direction. The wave had a period of 0.6 inches and a peak to peak amplitude of 0.3 inches. The angle corresponding to the angle C of FIG. 6 was 90°. The surfaces 112, 114 each formed an angle of only about 12° with a horizontal plane.

In a wind tunnel test at a velocity of 75 ft/sec the modified car model described above had an overall drag 16 percent less than the overall drag on the model prior to modification, despite an approximately 12.5 percent increase in the base surface area. Since only the rear end of the vehicle was modified, it can be assumed that the overall drag reduction was essentially due to reduced base drag.

FIGS. 10 and 11 show the same trough concept applied to a trailer truck generally designated by the reference numeral 150. As shown, troughs 152 are formed as depressions in the normally flat side surfaces and the top and bottom surfaces of the trailer. The trough outlets 154 are in the plane of the blunt rear end surface 156 and form a smooth wave shape along the four edges of the end surface 156. Although formed as depressions, the troughs could equally well have been formed by adding material to the trailer surfaces as was done to the automobile 100 shown in FIGS. 7-9.

Figure 12:
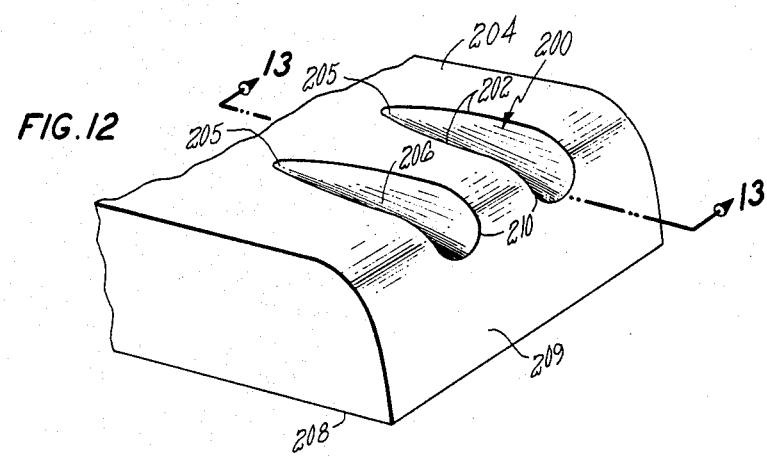
FIG. 12 is a side elevation view of a projectile incorporating features of the parent application of this CIP application.
Figure 13:
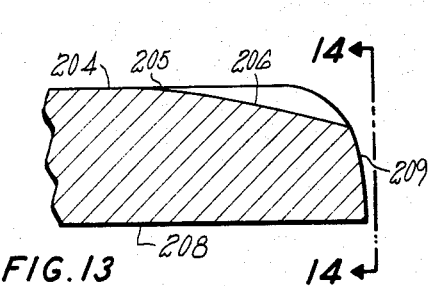
FIG. 13 is an end view of the projectile of FIG. 12 taken generally in the direction of the line 13—13 of FIG. 12.

The trough configuration may also be used to reduce the base drag of a projectile, such as the ballistic shell 300 shown in FIGS. 12 and 13. Projectiles of this type typically rotate in flight about their longitudinal axis, such as the axis 302 of the shell 300, for purposes of aerodynamic stability. The direction of rotation is represented by the arrow R. The shell 300 has an axial velocity V represented by the vector $\overline{V}_1$. The vector $\overline{V}_2$, which is tangent to the shell surface 306, represents the rotational velocity of the shell external surface 306 at the shell downstream end 304. Each trough extends generally parallel to the direction of the sum of the vectors $\overline{V}_1$ and $\overline{V}_2$. This trough orientation is required in order that the fluid flows into the troughs in a direction substantially parallel to the trough length.

Figure 4:
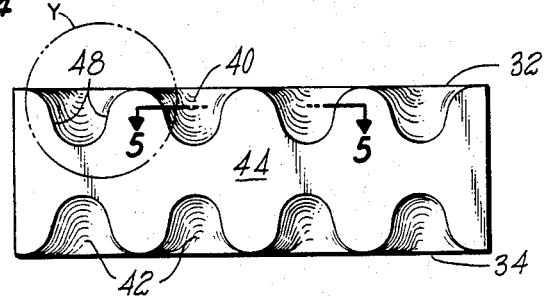
FIG. 4 is a view taken generally in the direction of the line 4—4 of FIG. 3.

Although troughs of generally semicircular cross section are shown in this embodiment, the troughs could also be configured as shown in the embodiment of FIGS. 4-6 (i.e., U-shaped troughs formed by a smoothly undulating surface, wave-shaped in cross section perpendicular to the downstream direction).

Figure 14:
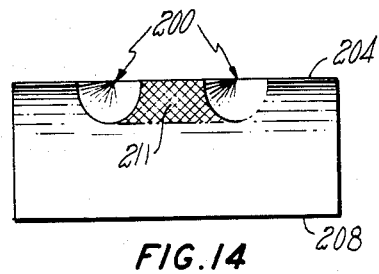
FIG. 14 is a perspective view of apparatus illustrating the present invention and how it is believed to work.

Base drag may also be reduced using some of the same fluid dynamic concepts employed in the invention described above with respect to FIGS. 1-13, but without the need to modify the shape of the blunt based article. The present invention utilizes a convoluted wall member or plate located upstream of the blunt end and which generates the same type of counterrotating vortices as generated by the troughs and lobes formed in the body of the article itself. FIG. 14 shows such a convoluted wall member and illustrates of the counterrotating vortices formed by the troughs and lobes thereof.

In FIG. 14 a blunt based article is generally represented by the reference numeral 200. The article 200 has a smooth, relatively flat upper surface 202 over which fluid flows in the generally downstream direction represented by the arrows 204. The article 200 has a blunt base or end surface 206. Without the present invention the flow along the surface 202 is assumed to separate from the article along the line 208. For purposes of the present application and the appended claims of the separation line 208 shall be considered the beginning or upstream edge of the blunt end surface 206.

A convoluted wall member 210 according to the present invention is mounted on and spaced from the surface 202 by means of support members or standoffs 212, only one of which is shown in the drawing. The plate 210 has an upstream or leading edge 214 and a downstream or trailing edge 216. While the plate may be fairly thin, the leading edge 214 should be rounded, like the leading edge of an airfoil, to assure that attached uniform flow is initiated on both the upper surface 218 and lower surface 220 of the plate. The plate may then taper to a smaller thickness, if desired, toward the trailing edge 216, such as to save weight or to minimize base drag of the plate itself.

In this illustration a plurality of U-shaped troughs 222 and lobes 224 are formed in the plate. Adjacent troughs and lobes blend smoothly into each other forming an undulating or convoluted downstream portion of the plate which terminates as a wave-shape at its trailing edge 216. For vortices to be generated through depth must increase in the downstream direction, although trough depth could reach its maximum upstream of the trough outlet and thereafter remain constant to the outlet. In FIG. 14, the plate leading edge 214 is straight and the plate is flat for a short distance. The troughs and lobes blend smoothly into the flat portion. Preferably, and as shown, trough depth (and lobe height are zero at their upstream ends and are maximum at the downstream edge 216; however, the plate leading edge 214 could have a low amplitude wave shape, and the trough depth would increase from that initial amplitude. The contour and shape of the troughs and lobes is selected such that the troughs flow full throughout their length.

Since the plate 210 is attached to the article 200, the plate itself creates losses (i.e. drag) which should be minimized. If one initially considers an imaginary, smooth plate without convolutions and which is generally parallel, locally, to the surface above which it is disposed, the peaks and valleys of the troughs and lobes preferably extend an equal distance above and below such "imaginary" plate.

The vortices generated by the troughs and ridges on each side of the plate are shown schematically in the drawing. One vortex, having its axis in the bulk fluid flow direction, is generated off of each sidewall of each trough. Thus, the trough 226 generates a clockwise rotating vortex 28 from its right sidewall (as viewed in FIG. 14) and a counter clockwise rotating vortex 230 from its left sidewall. An adjacent trough 232 on the opposite side of the plate to the left of the trough 226 also generates a counter clockwise rotating vortex 234 from its right wall which combines with and reinforces the counter clockwise rotating vortex 230 to form what is essentially a single stronger vortex. Similarly, the left side wall of the trough 236 generates a clockwise rotating vortex 238 which combines with the clockwise rotating vortex 228 from the trough 226.

If the plate 210 is properaly spaced and oriented relative to both the surface 202 and the blunt end surface 206, then the vortices generated therefrom will energize the boundary layer flow on the surface 202 downstream of the plate thereby resulting in the flow remaining attached to the article surface beyond the imaginary separation line 208. Furthermore, it is believed the bulk fluid flowing from the troughs and over the surface 202 is directed downwardly (in FIG. 14) into the space behind the blunt end surface 206 to further reduce the separation bubble which would otherwise be formed and thereby further reduce base drag.

For purposes of the following discussion, and still referring to FIG. 14, P is the peak to peak wave length at the plate trailing edge 216; A is the peak to peak wave height or amplitude (and may also be referred to as the trough depth); H is the distance between the surface 202 and the closest wave peaks of the trailing edge 216; and D is the distance between the trailing edge 216 and the upstream edge of the blunt end surface which is the separation line 208 as discussed above. Preferably the peak to peak wave length P is constant over the full length of the troughs.

One object of the invention is to delay separation from the surface 202 as long as possible. In other words, with the invention in operation it is desired to keep the flow attached beyond the line 208. This requires energizing the boundary layer on the surface 202. If the surface 202 meets the surface 206 to form a relatively sharp edge, delayed separation would not be possible. In that case it would be preferred to have the trough outlets substantially aligned with or at least close to the sharp edge (i.e., the dimension D would be small or zero). This would maximize the flow of the fluid into the base drag region.

Different considerations come into play when there is a smooth, curved transition area between the surfaces 202 and 206, as is the case in the embodiment of FIG. 14. Since the vortices do not become fully developed for a distance downstream of the plate edge 216, and because it is desired to have the vortices energize the boundary layer upstream of the line 208, it is preferred that the trailing edge 216 be located a distance D equal to one to two wave amplitudes A upstream of the blunt end surface 206. This does not mean that no benefit would be achieved if D were less A or even zero; however, it is believed the advantages of the present invention would be lessened. Similarly, if the plate is situated too far upstream from the end surface 206 the vortices might significantly or completely dampen out before reaching the end surface 206 and thereby provide little or no benefit.

The distance H should be sufficiently great to avoid casting secondary flow fields or blockage adjacent the surface 202 which might disrupt and cause separation of the boundary layer on the surface 202 before it reaches the line 208. Concurrently, the distance H should be as small as possible to keep the vortices as close to the surface 202 as possible. It is believed that H should be at least about the thickness of the boundary layer.

The slope $\theta$ of the trough bottom relative to the bulk fluid flow direction adjacent the plate cannot be too shallow or too steep. If the slope is too shallow, the strength of the vortices generated will be too weak or they may not be generated at all as a result of losses from surface friction. It is believed that $\theta$ should be at least about 5°. On the other hand, if the slope is too steep the troughs will not flow full (i.e., there will two-dimensional streamwise boundary layer separation within the troughs). This would hinder the formation of the vortices. It is believed the slope should be no greater than about 30°, and most preferably no greater than 20°.

As far as the steepness of the sidewalls of each trough is concerned, substantially parallel sidewalls at the trailing edge 216 and for a distance upstream thereof are preferred. The preferred sidewall angle C has previously been discussed with respect to FIG. 6.

Preferably the overall length of the plate from its leading edge 214 to its trailing edge 216 is equal to or slightly greater than the length L of the troughs and ridges. Excessive length, while not devastating, will also not provide any advantage and will simply add unnecessary surface drag, cost and weight. As mentioned above, the leading edge 214 should be rounded and the troughs and lobes should be shaped and sized along their entire length to assure that the troughs flow full throughout their length and generate vortices which are sufficiently strong to provide a benefit (i.e., drag reduction) deemed to be worthwhile considering the needs of the particular application.

In general, it is believed that the wave length P should be no less than about half and no more than about four times the wave amplitude A in order to assure the formation of strong vortices without inducing excessive pressure losses. The sum of the downstream projected cross-sectional flow areas of the trough outlets should be large enough, relative to the total downstream projected area of the blunt end surface to have a worthwhile impact on base drag, as has been previously discussed with respect to the troughs formed directly in the flow surface of the article. While a ratio of the trough outlet area to the blunt base area of 1/20 or even less may be useful for some applications, a ratio of greater than 1/10 would be preferable. Practical considerations such as physical constraints, cost and weight, and even aesthetics will also have various degrees of impact upon the final configuration selected.

Figure 15:
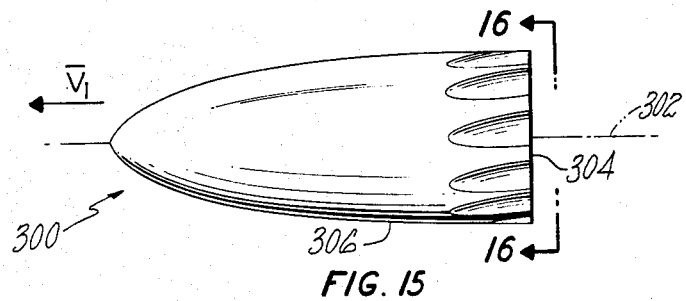
FIG. 15 is a partial side elevation view of an automobile incorporating the present invention.
Figure 16:
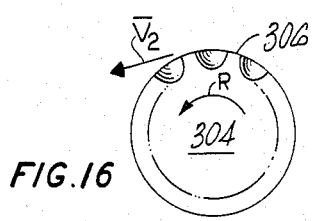
FIG. 16 is a view in the direction 16—16 of FIG. 15.

FIGS. 15-18 show the present invention applied to an automobile body. In FIG. 15 a convoluted plate 300 is attached to the roof of an automobile to reduce base drag behind the rear window area 302 which is a blunt end surface. Another convoluted plate 304 is disposed on the upper trunk surface 306 to reduce these drag created by the rear end surface 308 of the automobile. As best shown in FIG. 16, the plates 300 and 304 extend transversely across substantially the full width of the blunt surface with which they are associated.

Figure 17:
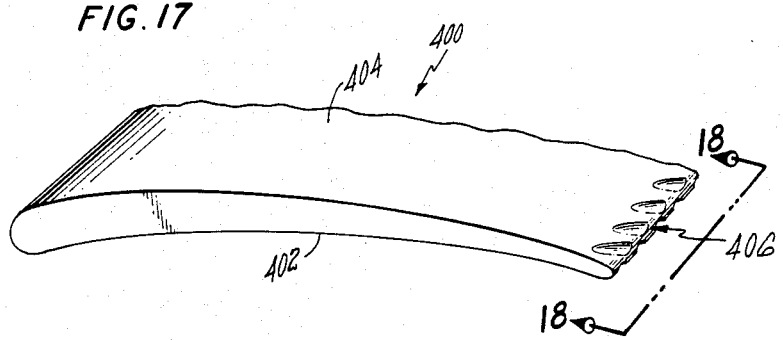
FIG. 17 is an enlarged view if the apparatus of the present invention shown in FIG. 15.
Figure 18:
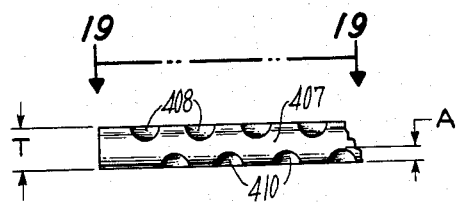
FIG. 18 is a view in the direction 18—18 of FIG. 17.

As shown in FIG. 15 and in the enlarged view of the plate 304 in FIG. 17, the end surface 308 is substantially perpendicular to the trunk surface 306 and forms a relatively sharp corner 310 where they join together. Because of the sharp corner 310 the present invention cannot delay separation; however, base drag will still be reduced by the action of the vortices in directing fluid down into the base drag region immediately behind the surface 308.

Assume the height Z of the end surface 308 is 20 inches and the width W is 72 inches. Based upon such assumptions it is suggested that the length L of the troughs be about 7.5 inches and the overall length Y of the plate be about 9.0 inches, length being measured in the direction of bulk fluid flow adjacent the surface 306 which is toward the rear of the car and substantially parallel to the surface 306. The flat upstream portion 316 of the plate is parallel to the bulk fluid flow direction; and the troughs and ridges are symmetrical above and below an imaginary plane which is an extension of the flat portion 316. The peak to peak wave amplitude A is 4 inches and the wave length P is 6 inches. The slope $\theta$ of the floor of each trough is 15° relative to the bulk fluid flow direction. The trough floors blend smoothly into the flat plate portion 316. The trailing edge 312 of the plate is located a distance D of 4 inches from the blunt surface 308. The trailing edge 312 is also spaced a distance H of 1.0 inch above the surface 306. This distance was selected based on an assumed 99% boundary layer thickness of 0.5 inch.

The opposing sidewalls 318 of each trough are parallel to the bulk fluid flow direction and essentially vertical at their steepest points at the trailing edge 312 and for a distance of 3.0 inches upstream from the downstream edge. The troughs and lobes are identical in size and shape on both the upper and lower plate surfaces; and their curvature is essentially circular. As viewed in FIG. 18, the radius R is 1.5 inches at the trailing edge. From the dimensions given above, it can be determined that in the embodiment the sum of the cross sectional outlet areas of the troughs of the plate 304 is equal to about 20% of the area of the blunt end surface 308.

Although the invention has been shown and described with respect to a preferred embodiment thereof, it should be understood by those skilled in the art that other various changes and omissions in the form and detail of the invention may be made without departing from the spirit and scope thereof.

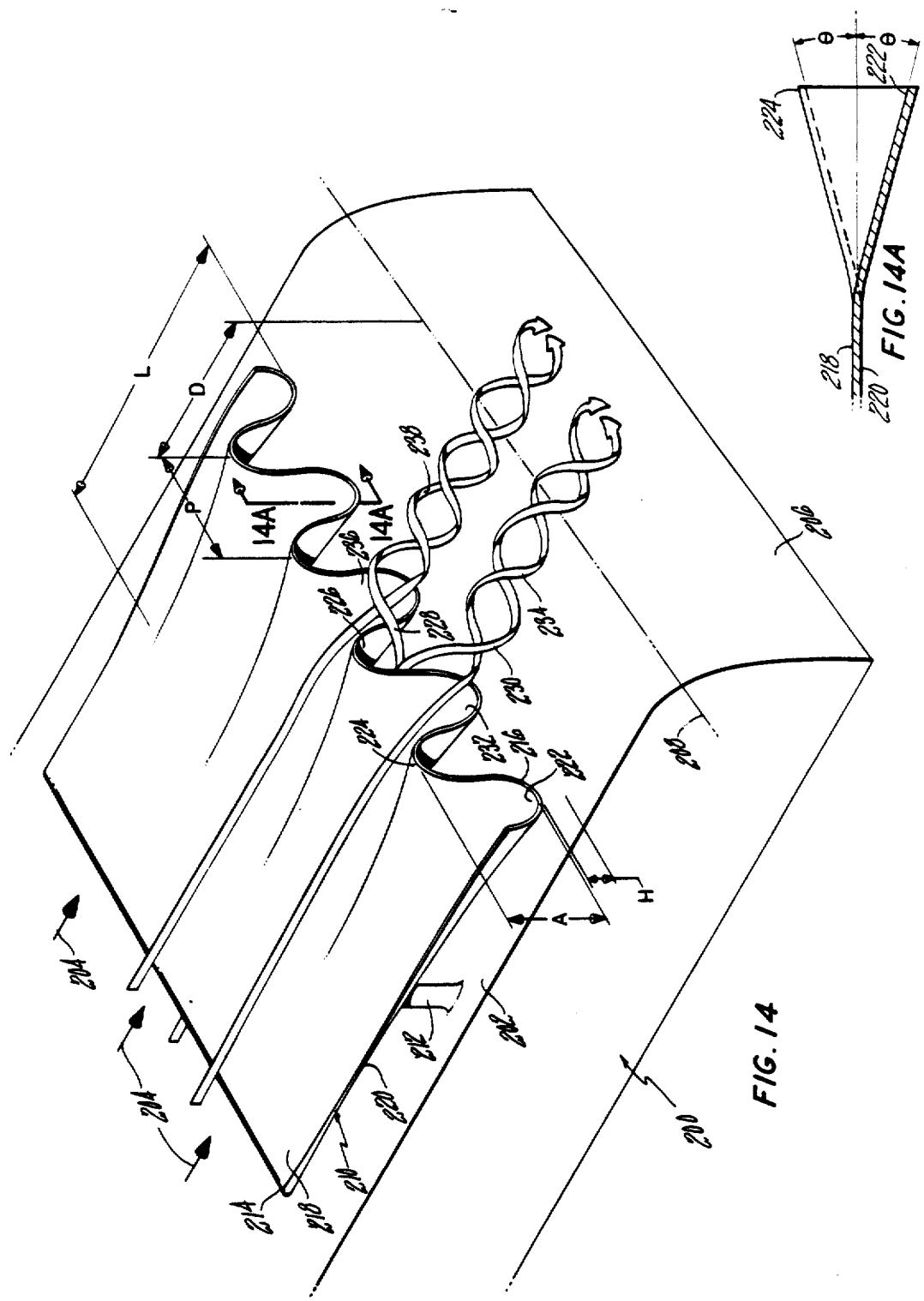

We claim:

1. A blunt based body adapted to be disposed in a fluid moving downstream relative thereto, said body having a first surface extending generally downstream, and a blunt end surface immediately downstream of and adjoining said first surface and facing generally downstream, said body including a vortex generating plate-like member disposed upstream of said end surface and having oppositely facing, downstream extending flow surfaces, an upstream edge and a downstream edge, one of said flow surfaces facing and spaced from said first surface forming a channel therebetween for the flow of said fluid, said downstream edge of said plate-like member extending transversely to said downstream direction across a substantial portion of the width of said blunt end surface, said member having a convoluted downstream portion comprising a plurality of adjoining, alternating, U-shaped lobes and troughs extending in the direction of bulk fluid flow adjacent thereto and terminating at said downstream edge, said trough depth and lobe height increasing in the downstream direction, the contour and dimensions of said troughs and lobes being selected to insure that each trough generates a pair of adjacent vortices downstream of said downstream edge sufficiently close to said blunt end surface to reduce base drag, said adjacent vortices generated by each trough rotating in opposite directions about respective axes extending in the direction of trough length.

2. The body according to claim 1 wherein said troughs and lobes initiate downstream of said upstream edge with substantially zero depth and height, respectively.

3. The body according to claim 1 wherein along their length alternate lobe peaks are substantially equidistant above and below a plane parallel to the bulk fluid flow direction adjacent said member.

4. The body according to claim 1, wherein each of said troughs is smoothly U-shaped along its length in cross section perpendicular to the downstream direction and blends smoothly with the lobes adjacent thereto to define a smoothly undulating surface which is wave-shaped in cross section perpendicular to the downstream direction.

5. The body according to claim 1, wherein each trough has a pair of facing sidewalls, and wherein, in cross section perpendicular to the downstream direction, lines tangent to each sidewall of said pair of trough sidewalls at their steepest point at said trough outlet form an included angle of between 0° and 120°.

6. The body according to claim 1 wherein the body is a vehicle and the blunt end surface is a rear end surface of said vehicle.

7. The body according to claim 5, wherein said tangent lines form an included angle of between 0° and 60°.

8. The body according to claim 1, wherein the intersection between said first surface and said blunt end surface is a relatively sharp edge, and said downstream edge of said member is aligned with or located only a short distance upstream of said edge.

9. The body according to claim 1, wherein said first surface transitions to said blunt end surface as a smoothly curved surface of relatively large radius, and said downstream edge of said member is located upstream of said blunt end surface a distance D which is sufficient to result in energizing the boundary layer on said first surface to delay separation therefrom.

10. The body according to claim 9, wherein D is between about one to two times the peak to peak wave amplitude of said member as said member downstream edge.

11. The body according to claim 1 wherein each of said troughs has a pair of facing sidewalls, and said trough sidewalls extend substantially parallel to the direction of bulk fluid entering said trough.

12. The body according to claim 1 wherein each of said troughs has a downstream extending bottom surface and the slope of said bottom surface relative to the bulk fluid flow direction adjacent said member is between 5° and 30°.

13. The body according to claim 2 wherein said member includes a flat portion upstream of said convoluted portion and substantially parallel to the expected direction of bulk fluid flow.

14. A vortex generating plate-like wall member adapted to be disposed in a fluid moving downstream relative thereto, said member having oppositely facing flow surfaces extending in a first direction, an upstream edge transverse to said first direction and a downstream edge transverse to said first direction, at least one of said flow surfaces comprising a plurality of adjoining, alternating, U-shaped lobes and troughs extending in said first direction terminating at said downstream edge, and increasing in height and depth, respectively, in the downstream direction, whereby a downstream portion of said member is convoluted, the contour and dimensions of said troughs and lobes being selected to insure that during use each trough generates a pair of adjacent large-scale vortices downstream of said downstream edge, said pair of vortices generated by each trough rotating in opposite directions about respective axes extending in the first direction, wherein said wall member is adapted to be secured in closely spaced relation to a downstream extending exterior surface of a vehicle.

15. The wall member according to claim 14 wherein said member includes a flat portion upstream of said convoluted portion, and adjacent troughs on opposite sides of said member are disposed equidistant above and below the plane of said flat portion, each trough having a downstream extending bottom surface, the slope $\theta$ of said bottom surfaces relative to said plante being between 5° and 20°.

16. The wall member according to claim 15 wherein $\theta$ is between about 5° and 20°.

17. A land vehicle adapted to travel in a forward direction and having a blunt rear end surface and a forwardly extending body surface joining said rear end surface along a line, said vehicle including a vortex generating plate-like wall member having oppositely facing flow surfaces, one of said flow surfaces being closely spaced from and facing said body surface, said member having an upstream edge and downstream edge, both being transverse to said forward direction, said member being disposed upstream of said rear end surface and including a convoluted portion comprising a plurality of adjoining, alternating, U-shaped lobes and troughs extending in the forward direction and increasing in height and depth, respectively, in the rearward direction and terminating at said downstream edge, the contour and dimensions of said troughs and lobes being selected and said member downstream edge being located to insure that during vehicle movement in the forward direction each trough generates a pair of adjacent large scale counterrotating vortices which reduces base drag created by said rear end surface.

18. The vehicle according to claim 17 wherein the contour and dimensions of said troughs and lobes are selected such that no streamwise two-dimensional boundary layer separation occurs on said flow surfaces of said member.

19. The vehicle according to claim 18 wherein said member includes a flat portion upstream of said convoluted portion and substantially parallel to said body surface adjacent thereto.

20. The vehicle according to claim 17 wherein wherein said member includes a flat portion upstream of said convoluted portion, and adjacent troughs on opposite sides of said member are disposed equidistant above and below the plane of said flat portion, each trough having a downstream extending bottom surface, the slope $\theta$ of said bottom surfaces relative to said plane being between 5° and 30°.

21. The vehicle according to claim 20 wherein $\theta$ is between about 5° and 20°.

* * * * *

UNITED STATES PATENT AND TRADEMARK OFFICE
CERTIFICATE OF CORRECTION

PATENT NO.  : 4,776,535
DATED       : October 11, 1988
INVENTOR(S) : Robert W. Paterson, et al.

It is certified that error appears in the above-identified patent and that said Letters Patent is hereby corrected as shown below:

In the Drawing:

Delete: Sheet 5 of 7, Sheet 6 of 7 and Sheet 7 of 7.

Replace with: Sheet 5 of 7, Sheet 6 of 7 and Sheet 7 of 7 as shown the attached sheets.

Signed and Sealed this

Twenty-eighth Day of March, 1989

Attest:

DONALD J. QUIGG

*Attesting Officer*    *Commissioner of Patents and Trademarks*

Figure 19:
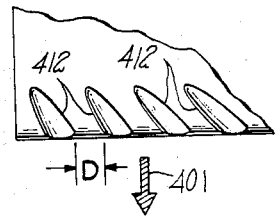
FIG. 19 is a perspective view of a "blade" in accordance with the prior art.
Figure 20:
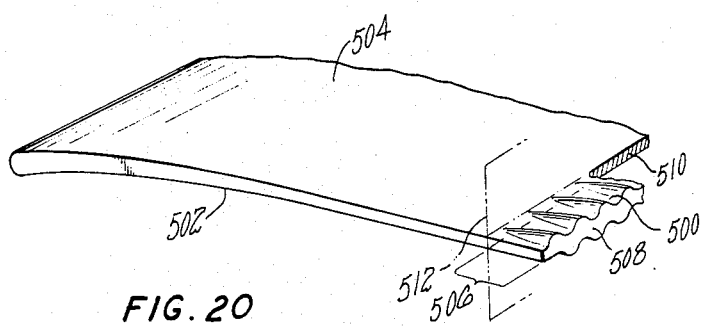
FIG. 20 is a cross sectional view taken along the line 20—20 of prior art FIG. 19.
Figure 21:
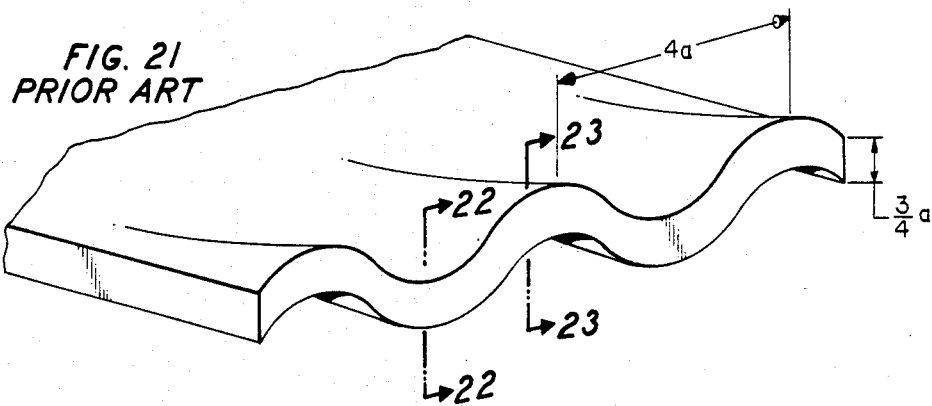
FIG. 21 is a cross sectional view taken along the line 23—23 of prior art FIG. 19.
Figure 22:
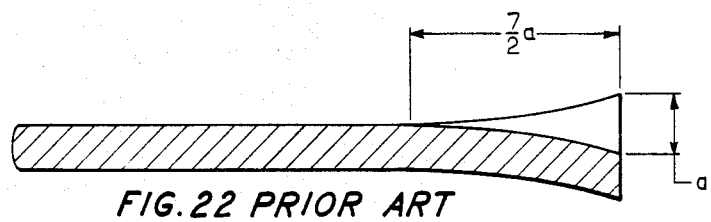
Figure 23:
Figure 15:
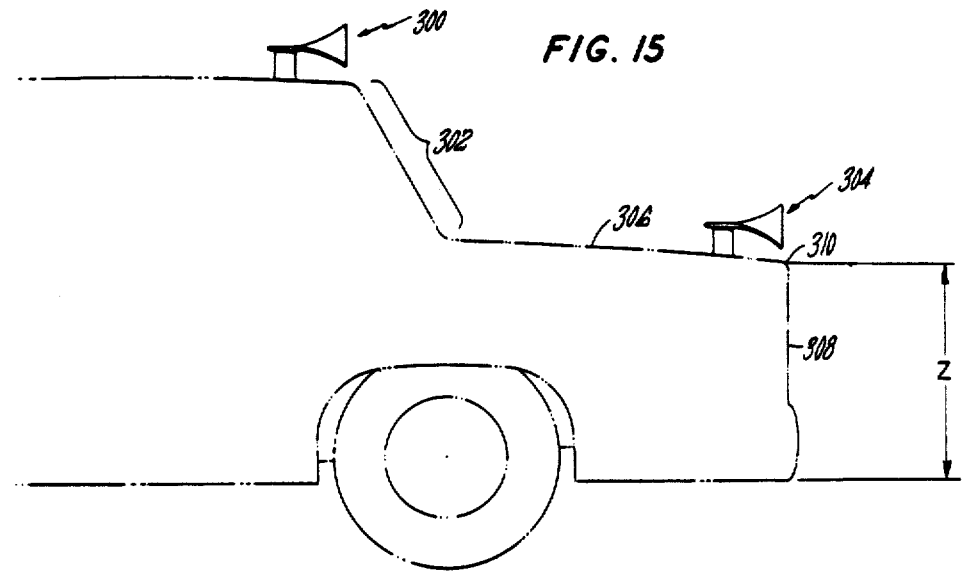
Figure 16:
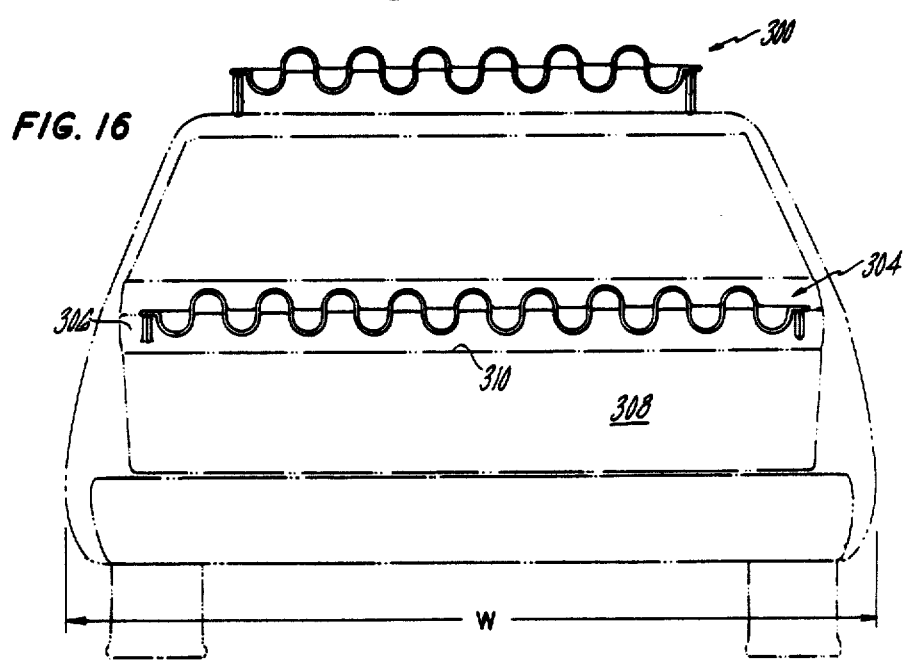
Figure 17:
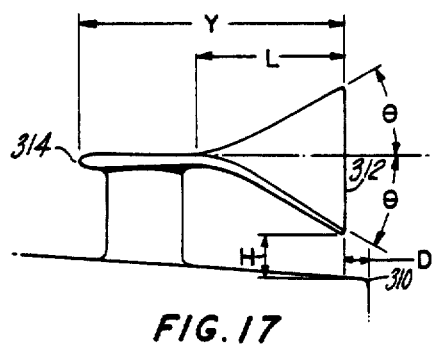
Figure 18:
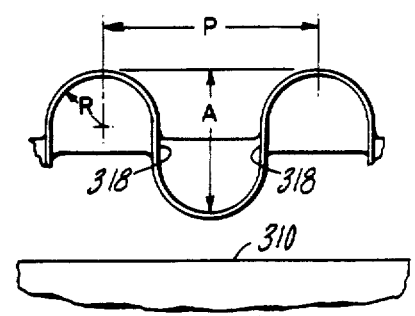

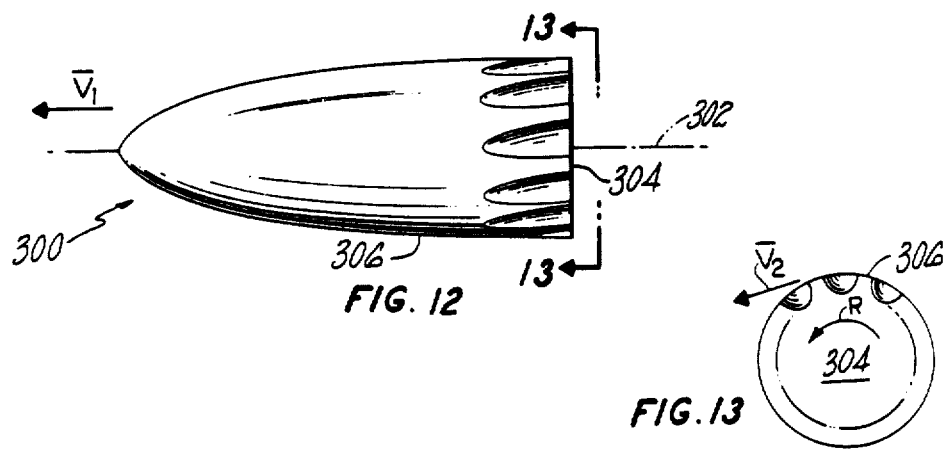
FIG. 12
FIG. 13
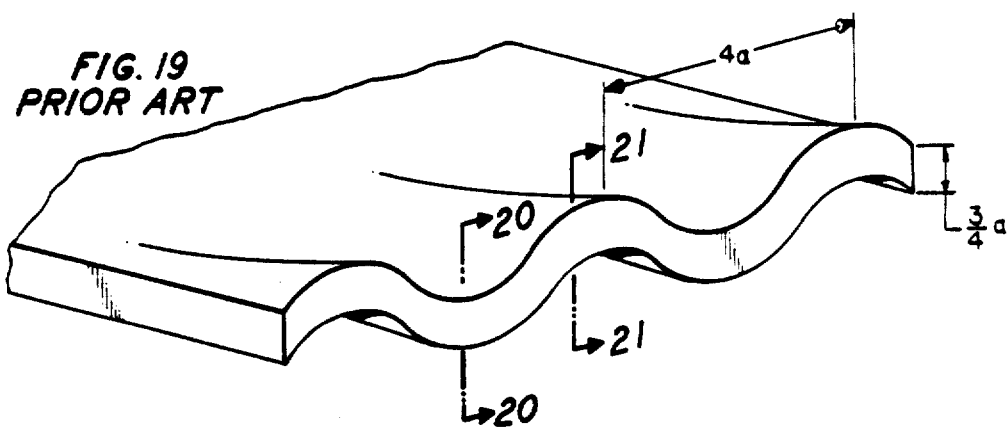
FIG. 19 PRIOR ART
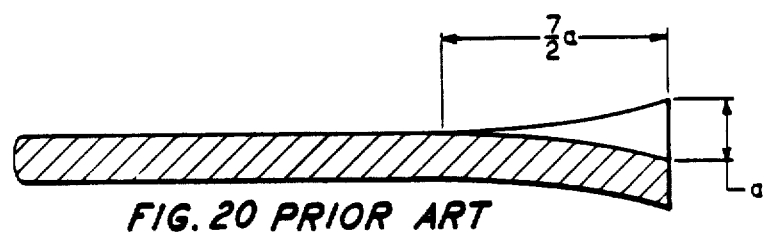
FIG. 20 PRIOR ART
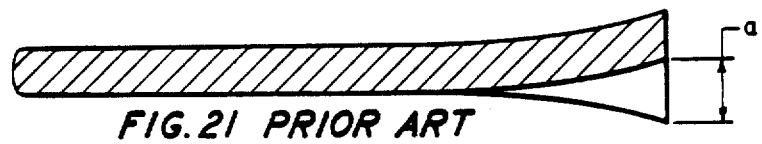
FIG. 21 PRIOR ART